(No Model.)
H. B. COLMAN & G. TURNER.
WINDMILL.
No. 317,731. Patented May 12, 1885.
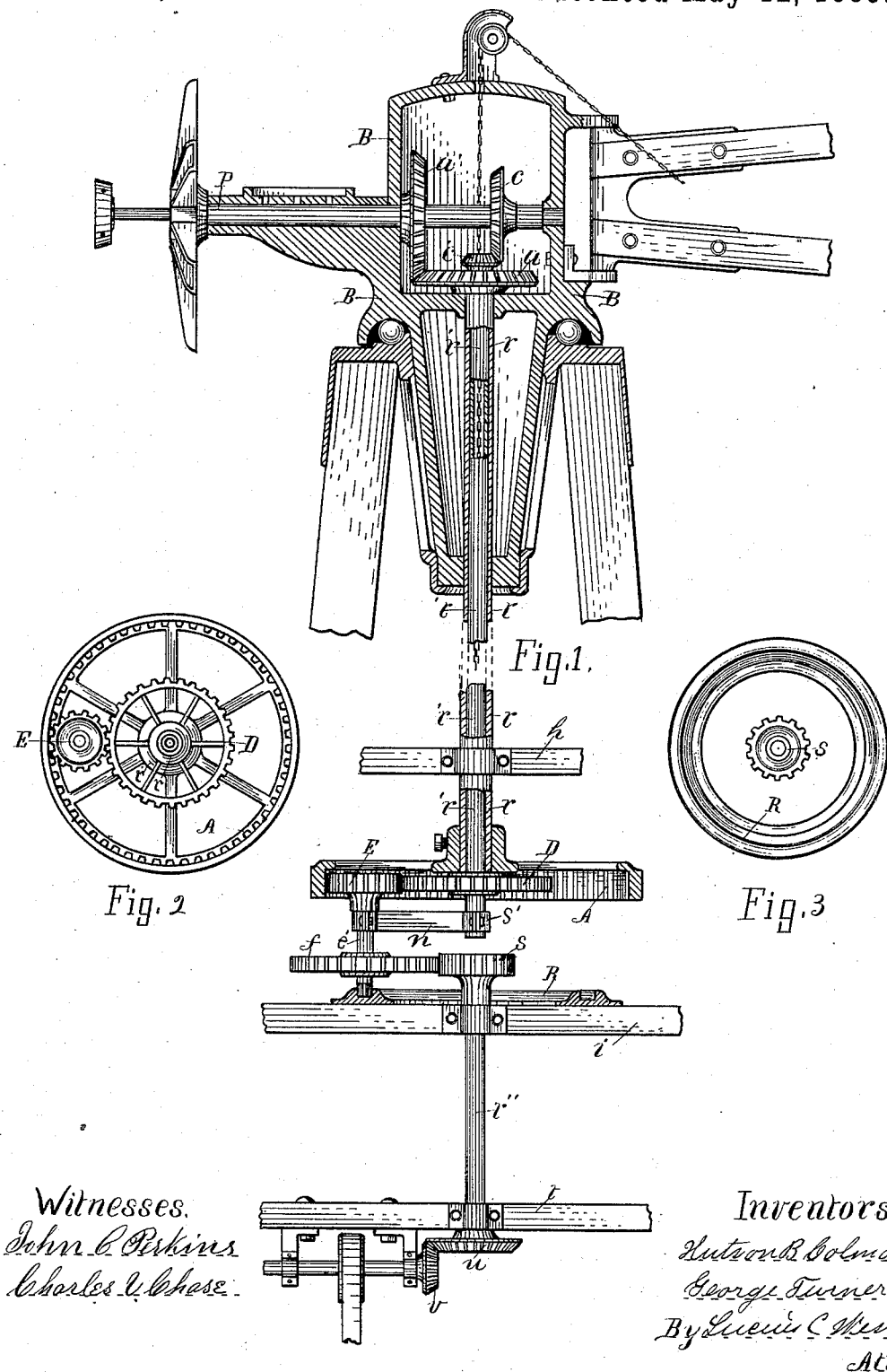
Witnesses.
John C. Perkins
Charles V. Chase
Inventors.
Hutson B. Colman
George Turner
By Lucius C. West
Atty.

UNITED STATES PATENT OFFICE.

HUTSON B. COLMAN AND GEORGE TURNER, OF KALAMAZOO, MICHIGAN.

WINDMILL.

SPECIFICATION forming part of Letters Patent No. 317,731, dated May 12, 1885.

Application filed February 28, 1885. (No model.)

*To all whom it may concern:*

Be it known that we, HUTSON B. COLMAN and GEORGE TURNER, citizens of the United States, residing at Kalamazoo, county of Kalamazoo, State of Michigan, have jointly invented a new and useful Power-Windmill, of which the following is a specification.

This invention has for its object improved means of transmitting power from a wind-wheel shaft having a swiveled bearing-support to a shaft or machinery having a stationary bearing-support.

In the accompanying drawings, forming a part of this specification, Figure 1 is a side elevation, portions of which are in vertical section; Fig. 2, an under plan view of parts in Fig. 1, referred to by like letters; and Fig. 3, a top plan of a part in Fig. 1, also referred to by like letters, all of which are fully described below.

Referring to the letters marked on the drawings, P is the wind-wheel shaft, B the swiveled bearing-support of said shaft, and $r'$ $r$ are concentric tubular power-shafts passing through the tubular pendent portion of the swiveled bearing-support, free to rotate independently of the movement of said support and wind-wheel in turning from one point of the compass to another, suspended from said support, and gear connecting with the wind-wheel shaft each side of the vertical center of the bearing-support B in a manner to be rotated in opposing directions independently of each other. The gears $a$ $c'$ form shoulders or heads to the shafts, preventing them from falling out of place. The gear $c'$ of the shaft $r'$ meshes with the gear $c$ at the wheel-shaft P, and the gear $a'$ of the latter-named shaft meshes with the gear $a$ of the power-shaft $r$, all in the manner of heretofore constructing and gearing these parts. The shafts have suitable guide-supports in the fixed beam $h$. To these suspended shafts $r'$ $r$ we connect gears, as in Figs. 1 and 2. The larger gear, A, is provided with internal cogs, and is secured to the shaft $r$, and the smaller gear within the larger is secured to the shaft $r'$. This gear D is provided with a cogged periphery. These gears turn in opposing directions, one within the other, when the shafts $r$ $r'$ rotate.

The gear E of a vertical shaft, $e'$, meshes with the gears A D, and traverses the space between the latter gears around the power-shafts $r'$ $r$. An arm, $n$, is swiveled at $s'$ to one of the power-shafts, and has bearings in its outer end for the shaft $e'$. The lower end of the shaft $e'$ has bearings in the groove of the rim R, around which groove said lower end plays. The rim or circular plate R is supported by a fixed beam, $i$.

$r''$ is a vertical shaft having bearings in the fixed beams $i$ $t$, and provided with a gear, $s$, meshing with the gear $f$ of the shaft $e'$. By this means motion is imparted from the wind-wheel shaft having a swiveled bearing-support to a shaft, $r''$, having a fixed or stationary bearing-support, it matters not at what point of the compass the wind-wheel may be running, and this rotary motion is kept up during the shifting of the wheel, for the reason that when the wheel shifts the gears A D are turned with it, carrying the shaft $e'$ and its gears E $f$ in a circle around the power-shafts, or part way around, as the case may be, owing to the distance the wheel shifts at a given time, thus causing the gears A D E $f$ $s$ to be at all times in operative relation. In this operation the gears A D exert each an equal leverage on the gear E, they being properly proportioned and cogged to this end; and the resistance of the work being done by the shaft $r''$, or machinery connected with it, does not cant the wheel out of its proper position in the wind. Of course, the axial center of the shaft $r''$ is in vertical line with the vertical center of the bearing-support B, said center being at the point indicated in the drawings by the chain passing vertically through the mill. The gears $u$ $v$ and shaft of the latter show how motion may be further transmitted to a horizontal shaft having a fixed bearing-support, which support in the drawings is the stationary beam $t$.

Having thus described our invention, what we claim as new, and desire to secure by Letters Patent, is—

The combination of a wind-wheel shaft, a swiveled bearing-support therefor, concentric power-shafts suspended from the bearing-support and forming operative engagement with the wheel-shaft on opposite sides of the vertical center of said bearing-support, and adapted to independently rotate in opposing directions, a gear connecting with and suspended by each power-shaft, a geared shaft having a stationary bearing-support, and a movable shaft provided with gears forming engagement with said geared shaft and with the gears of the power-shafts, said movable shaft having bearings allowing it to traverse a circle around the vertical center of the power-shafts, all substantially as set forth.

In testimony of the foregoing we have hereunto subscribed our names in presence of two witnesses.

HUTSON B. COLMAN.
GEORGE TURNER.

Witnesses:
GEO. C. WINSLOW,
L. WHITCOMB.